April 20, 1965 A. C. STANLEY 3,178,956
TWO-SPEED POWER TOOL TRANSMISSION
Filed June 20, 1963 2 Sheets-Sheet 1
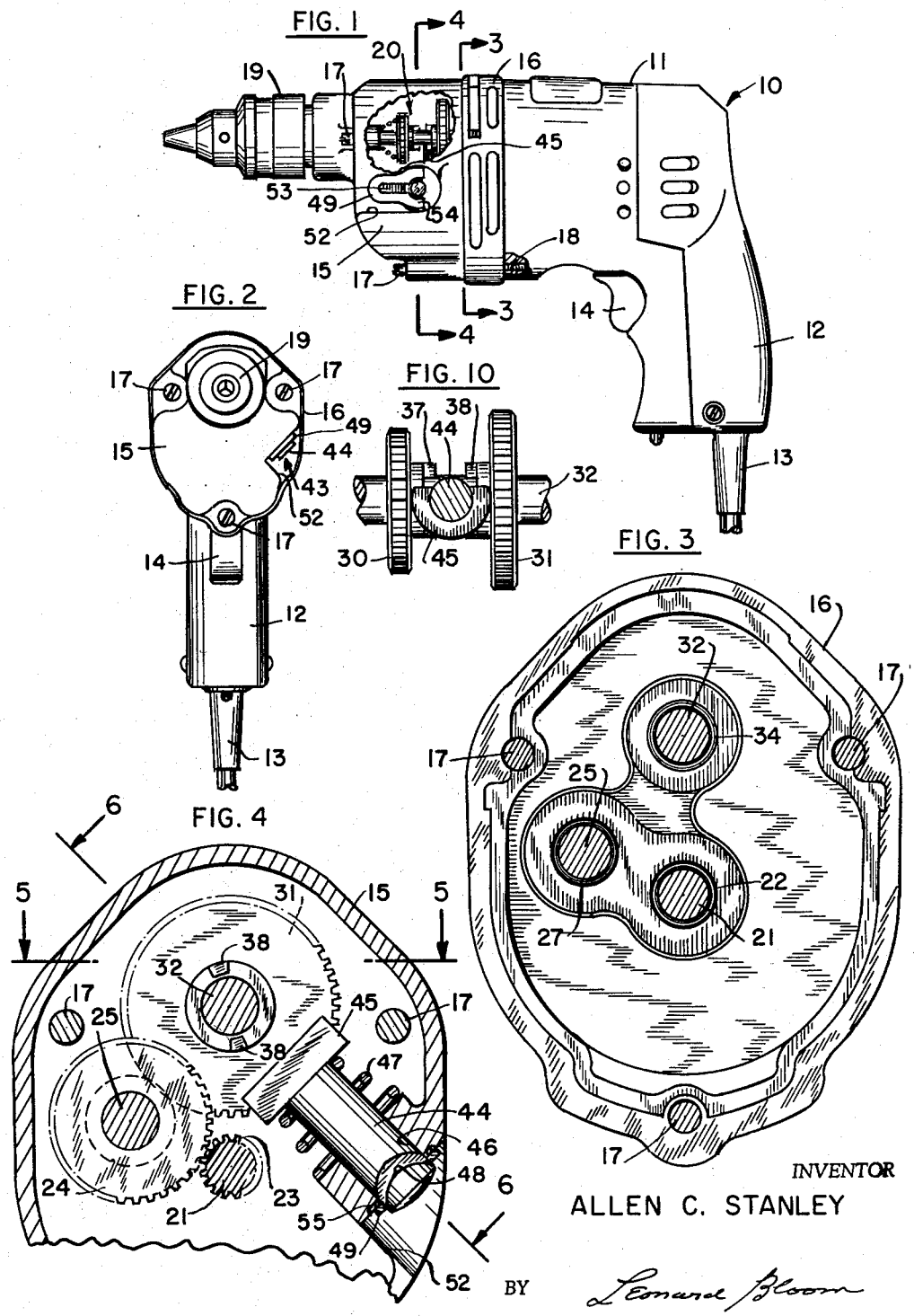
INVENTOR
ALLEN C. STANLEY
BY Leonard Bloom
ATTORNEY

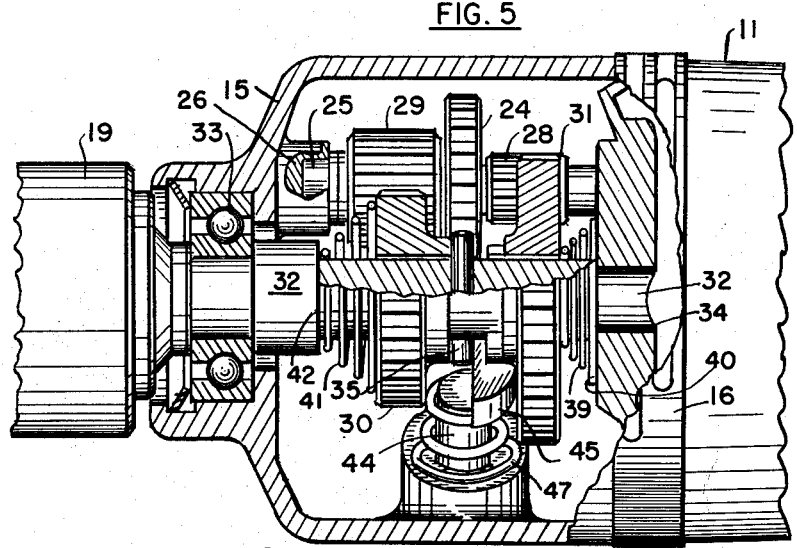
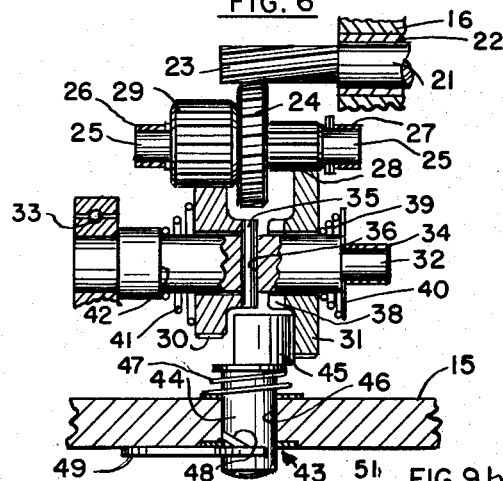
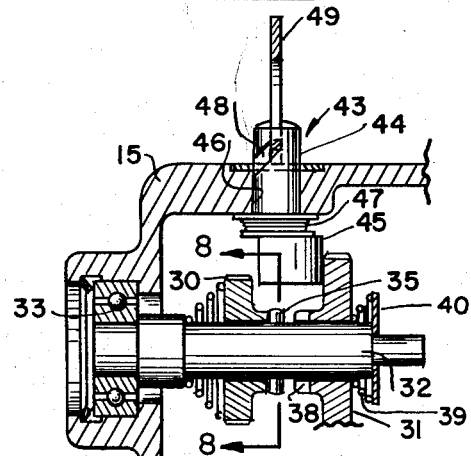
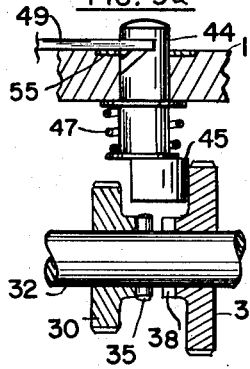
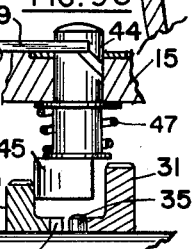
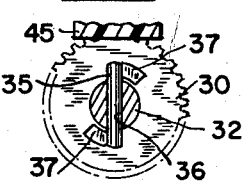

United States Patent Office 3,178,956
Patented Apr. 20, 1965

3,178,956
TWO-SPEED POWER TOOL TRANSMISSION
Allen C. Stanley, Baltimore, Md., assignor to The Black and Decker Manufacturing Company, Towson, Md., a corporation of Maryland
Filed June 20, 1963, Ser. No. 289,322
5 Claims. (Cl. 74—375)

The present invention relates to a two-speed power tool, and more particularly, to a two-speed transmission for a portable electric drill.

In the prior art of which I am aware, two-speed mechanical transmissions for portable electric tools, appliances, or related power-operated devices, have been designed and manufactured which generally utilize one or more sliding gears, or else a sliding gear cluster, to shift from one speed to another, the gears being alternately engaged and disengaged from the drive mechanism; and means, such as an eccentric carried by a rotatable shaft having an external knob, may be employed to engage the gear or gear cluster and slide it axially of the tool. In other instances, a pair of spaced-apart driven gears are rotatably mounted upon spindle, and an axially-slidable clutch member is splined or otherwise keyed to the spindle intermediately of the gears; cooperating clutch means, such as a plurality of circumferentially-spaced clutch teeth, are formed on the respective inner faces of the driven gears, and a bifurcated fork moves the clutch member axially in one direction or another to couple the desired one of the driven gears to the spindle for rotation in unison. Another prior art method involves the use of a reversible electric motor in combination with a planetary gear train and a dual set of clutches, such that the rotation of the motor in one direction automatically engages one set of clutches to provide for a given speed of operation; and such that upon reversal of the motor, the other set of clutches is automatically engaged to provide for a different speed.

These prior art methods in multiple-speed transmissions, especially as applied to small hand-portable electric tools, invariably suffer from a number of annoying deficiencies, which may be outlined generally as follows: (1) they are complicated and bulky, appreciably extend the length of the tool, and hence interfere with the operator's use of the tool; (2) they are somewhat costly to manufacture and difficult to service; (3) in many instances, such as in the use of sliding gears or gear clusters, it is not possible to shift from one speed to another during the operation of the tool, and care must be taken to avoid a clashing of gear teeth; and (4), and in general, they are not ideally suited for the high speed manufacture of a relatively low-cost two-speed power tool, one that will render reliable operation over an extended period of usage.

Accordingly, it is an object of the present invention to alleviate the aforementioned deficiencies of the prior art by providing a two-speed transmission suitable for use in a power-operated tool, such as a portable electric drill, wherein the transmission has the following features and advantages: (1) it is compact and lightweight, does not appreciably extend the overall length of the tool, and is convenient to use; (2) it is relatively easy and economical to manufacture and to service in the field; (3) it has a low unit cost and is well-suited for high-speed quantity production; (4) it employs a pair of sliding gears which are always in engagement with the drive mechanism, and hence the transmission can be shifted during the operation of the tool; and (5) it has a "neutral" position between its "high" and "low" positions, such that it is not possible to engage the desired gear until the other gear is fully out of engagement.

In accordance with the general teachings of the present invention, there is herein illustrated and described, a two-speed power tool which is provided with a gear case and a spindle journaled in bearings in the gear case. A pair of spaced-apart constantly-driven gears of different size are rotatably mounted upon the spindle and are movable along said spindle. A clutch element is carried by the spindle intermediately of the gears, and clutch means are carried by each of the gears for selective engagement with the clutch element. Means are provided to constantly urge each of the gears towards clutching engagement with the element, and manually-manipulatable shifting means are provided, counteracting the last-named means, for selectively moving either one of the gears away from the clutch element, thereby allowing the other of the gears to be brought into clutching engagement with the spindle for rotation in unison.

In accordance with the specific teachings of the present invention, there is herein illustrated and described, a two-speed power tool which is provided with a gear case and a spindle journaled in respective bearings in the gear case. A pair of spaced-apart constantly-driven gears of different size are rotatably mounted on the spindle and are movable along the spindle. A clutch pin is secured to the spindle intermediately of the gears, and the clutch pin has respective end portions which extend radially of the spindle. Clutch teeth are formed on the inner face of each of the gears for selective engagement with the clutch pin. A pair of springs are mounted on the spindle, one each bearing against the outer face of a respective one of the gears, thereby constantly urging each of the gears towards clutching engagement with the pin. A manually-manipulatable shift member is disposed intermediately of the gears and radially of the clutch pin for selectively moving either one of the gears (against the force of its respective spring) away from clutching engagement with the pin, thereby allowing the other of the gears to be brought into clutching engagement with the spindle for rotation in unison.

These and other objects of the present invention will become apparent from a reading of the following specification, taken in conjunction with the enclosed drawings, in which:

FIGURE 1 is a side elevation of the two-speed power tool showing the shift lever in a normal position flush against the gear case, and further showing the wall of the gear case partially broken away to illustrate, in elevation, a portion of the two-speed transmission;

FIGURE 2 is a front elevation of the two-speed power tool shown in FIGURE 1;

FIGURE 3 is a section view taken along the lines 3—3 of FIGURE 1, enlarged over the scale of FIGURE 1, and showing the relationship between the armature shaft, intermediate shaft, and output spindle;

FIGURE 4 is a section view taken along the lines 4—4 of FIGURE 1, enlarged over the scale of FIGURE 1, and showing a preferred form of shifting means used with the present invention;

FIGURE 5 is a section view taken along the lines 5—5 of FIGURE 4, showing the two-speed transmission in plan view, and further showing a portion of the shifting means;

FIGURE 6 is an expanded plan layout view taken along the lines 6—6 of FIGURE 4, and reduced slightly from the scale of FIGURE 4;

FIGURE 7 corresponds to a portion of FIGURE 5, reduced in scale from FIGURE 5, and showing the shifting means in its raised position for subsequently shifting from one speed to another;

FIGURE 8 is a detail section view taken along the lines 8—8 of FIGURE 7, showing the clutch pin cooperating with the pair of diametrically-opposed clutch teeth formed on each of the driven gears;

FIGURES 9a, 9b, and 9c are sequential views showing, respectively, the "high," "neutral," and "low" positions of the two-speed transmission of the present invention; and FIGURE 10 is a detail section view taken along the lines 10—10 of FIGURE 9b, showing the eccentric disposed intermediately of the driven gears and taking one gear out of engagement before allowing the other gear to be engaged.

With reference to FIGURES 1 and 2, there is illustrated a portable electirc drill 10 with which the teachings of the present invention may find more particular unity. It will be appreciated, however, by those skilled in the art that the teachings of the present invention are equally applicable to a wide variety of power-operated tools, appliances, and other devices, and that the specific illustration of the portable electric drill 10 is only for convenience and clarity of understanding and does not thereby limit the scope of the invention. With this in mind, the drill 10 comprises a motor housing 11, a pendant handle 12, an electrical cord 13, a trigger switch 14, a gear case 15 and gear case cover 16 secured forwardly of the motor housing 11 by means of a plurality of screws 17 which are received within respective threaded recesses 18 formed in the motor housing 11, a conventional chuck 19, and the two-speed transmission of the present invention, the later being denoted generally by the numeral 20.

With reference again to FIGURES 1 and 2, and with further references to FIGURES 3, 4, 5, and 6, the motor housing 11 includes a motor (not shown) which has an armature shaft 21 journaled in a bearing 22 in the gear case cover 16. The armature shaft 21 projects within the gear case 15, and a suitable pinion 23 is formed thereon. The pinion 23 engages (or meshes) with an intermediate gear 24 carried by the intermediate shaft 25. The intermediate shaft 25 is journaled in bearings 26 and 27 in the gear case 15 and gear case cover 16, respectively. A pair of spaced-apart gears 28 and 29 of different size are carried on the intermediate shaft 25, one on each side of the intermediate gear 24. The gears 29 and 28 are constantly in mesh with a pair of spaced-apart driven gears 30 and 31, respectively, of different size, which are rotatably mounted on an output spindle 32, and which are movable axially along the spindle. The spindle 32 is journaled in bearings 33 and 34 retained in the gear case 15 and gear case cover 16, respectively, and the chuck 19 (or other tool holder) is secured to the spindle 32 in a conventional maner. The respective axes of the armature shaft 21, intermediate shaft 25, and spindle 32, see FIGURES 3 and 4, are all parallel to each other, but are radially offset one from another.

With reference again to FIGURE 6, and with further reference to FIGURES 7 and 8, a clutch element, preferably comprising a pin 35, is press-fitted within a transverse bore 36 formed in the spindle 32 intermediately of the rotatably-mounted gears 30 and 31. The clutch pin 35 has respective end portions which extend radially of the spindle 32 and are adapted to engage cooperating clutch means carried by each of the gears 30, 31, thereby coupling a selected one of the gears 30, 31 to the spindle 32 for rotation in unison. Preferably, the cooperating clutch means, see FIGURE 8, comprises respective pairs 37, 38 of diametrically-opposed clutch teeth formed on the inner faces of the gears 30 and 31. A coil-type of spring 39 (or other resilient means) is seated against a washer 40 that is disposed against the front face of the gear case cover 16, and the spring 39 bears against the outer face of the gear 31 and thus constantly urges the gear 31 forwardly into clutching engagement with the pin 35. Similarly, a coil-type of spring 41 (or other resilient means) is seated against an annular shoulder 42 formed on the spindle 32, and the spring 41 bears against the outer face of the gear 30 and thus constantly urges the gear 30 rearwardly into clutching engagement with the pin 35. Consequently, means are provided to constantly urge each of the gears 30 and 31 into clutching engagement with the pin 33; and shifting means are provided, in opposition to and counter-acting the resilient means, to move one or the other of the gears 30, 31, away from engagement with the pin 33, thereby allowing a "desired" one of the gears, under the influence of its respective spring, to automatically engage the pin 35 for coupling that desired gear to the spindle 32 for rotation in unison. The teachings of the present invention, therefore, contemplate a pair of spring-loaded rotatably-mounted gears in combination with means to move the "undesired" gear away from clutching engagement with the spindle, rather than axially sliding a "desired" gear or gear cluster along a spindle.

With reference again to FIGURES 1, 2, 4, 5, 6, and 7, there is illustrated a prefered embodiment of the manually-manipulateable shifting means 43 which may be utlized in conjunction with the present invention. It will be appreciated, however, that the teachings of the present invention are equally applicable to a wide variety of shifting means, and that the essence of the present invention is not necessarily confined to the particular form of the shifting means 43 herein illustrated and described. With this in mind, the shifting means 43, which is the subject of the co-pending Enders et al. application S.N. 289,323, filed June 20, 1963, entitled "Manually-Manipulatable Shifting Means for Two-Speed Power Tool," and assigned to the assignee of the present invention, comprises a shaft 44 which preferably is molded from a suitable anti-friction type of material, such as nylon or a derivative thereof; and the shaft 44 carries a suitable eccentric means, such as the integrally-formed eccentric 45, on the inner end thereof. The shaft 44 is journaled in a bore 46 formed in the wall of the gear case 15 for rotary movement about its axis and also for limited longitudinal movement radially in and out of the gear case 15. A coil spring 47 is retained between the eccentric 45 and the wall of the gear case 15 so as to constantly urge the shaft 44 inwardly of the gear case 15. The outer end of the shaft 44 has a closed cam slot 48 formed therein; the slot 48 is formed transversely to the axis of the shaft 44, with their respective axes diverging away from each other in a direction inwardly of the gear case 15. A substantially-flat lever 49 has an opening 50 and further has an integral bridge portion 51 which closes off the opening 50. The bridge portion 51 of the lever 49 is received within the closed cam slot 48 formed in the shaft 44 and bottoms in the slot, and hence the lever 49 is secured to the shaft 44 for pivoting movement of the lever 49 about an axis which is transverse to the axis of the shaft 44 and for conjoint rotary movement of the lever and shaft about the axis of the shaft. Preferably, the lever 49 is received within a substantially flat-bottomed inwardly-directed recess 52 formed in the adjacent wall of the gear case 15; the lever 49 is urged by the spring 47 to a normal position which is flush against the bottom of the recess 52, and the lever 49 prevents the complete inward withdrawal of the shaft 44. In its normal position, the lever 49 does not extend radially beyond the projected contours of the gear case 15 above the recess 52, and hence the shifting means 43 does not interfere with the securing of any conventional attachments (not shown) to the drill 10, and more particularly, to the gear case 15 and gear case cover 16 thereof. Consequently, the portable electric drill 10 has the desirable advantage of two-speed operation, yet this advantage is realized and is fully compatible with the use of conventional attachments for converting the drill to perform a number of different operations, such as sawing, jig sawing, sanding, or hedge trimming. The recess 52 is provided with a raised portion 53 which is received within the opening 50 in the lever 49, so as to key the lever 49 to the gear case 15 and prevent inadvertent shifting of the lever 49 in its normal flush position within the recess 52. The lever 49 is further provided with a pair of tabs 54, one on each side of the bridge portion 51 and extending therefrom; and a wear washer 55 is retained within the recess 52 for engagement with the tabs 54. Consequently, when the free end of the lever 49 is raised up and away from the gear case 15, the tabs 54 pivot on the surface of the wear washer 55, and the shaft 44 is withdrawn slightly from the gear case 15; and thereafter, when the lever 49 has been raised sufficiently to clear the adjacent walls or confines of the recess 52, the lever 49 may be rotated about the axis of the shaft 44, laterally reversed, and returned to an alternate position which is again flush against the bottom of the recess 52. Rotation of the lever 49 results in a conjoint rotation of the shaft 44 and eccentric 45 to an alternate 180° position. The eccentric 45 is disposed intermediately of the gears 30 and 31 and radially of the clutch pin 35, see FIGURES 6 and 10, and is adapted to bear against one or the other of the gears 30, 31 to push the "undesired" gear out of the way, thereby allowing the other of the gears, under the impetus of its respective spring, to be coupled automatically to the spindle 32 through the cooperating clutch means.

Operation

With reference to FIGURES 9a, 9b, and 9c the inherent utility and operation of the present invention may be more clearly understood. In FIGURE 9a, the two-speed transmission 20 has been adjusted so that the clutch teeth 37 of the gear 30 are in engagement with the pin 33, thereby coupling the gear 30 to the spindle 32, and such that the eccentric 45 has engaged the respective inner face of the other (and larger) gear 31 so as to move gear 31 away from clutching engagement with the pin 33. This is the "high" speed position of the transmission 20. Then, in FIGURE 9b, the free end of the shift lever 49 has been lifted up and away from the surface of the gear case 15 so as to clear the adjacent walls of the recess 52 (the shaft 44 being withdrawn radially out of the gear case 15 by a slight amount against the force of the spring 47) and thereafter, the lever 49 and the shaft 44 may be rotated conjointly about the axis of the shaft 44 so as to move the eccentric 46 towards its alternate 180° position. In FIGURE 9b, the eccentric 45 has now engaged the inner face of gear 30, yet it is still in engagement with the respective inner face of the gear 31, see FIGURE 10, so that both gears are out of clutching engagement with the spindle 32. This corresponds to a "neutral" position, that is, it is not possible to bring one gear into clutching engagement with the spindle 32 until the other gear has been fully disengaged. Thus the transmission 20 may be shifted from one speed to another during the operation of the drill without the necessity for removing the drill from the work, or without the necessity for completely shutting down the drill; yet this is accomplished without any clashing of gear teeth which would otherwise detract from the use and serviceability of the tool. Then, in FIGURE 9c, and in the manner previously explained, the lever 49 has been moved into its alternate laterally-reversed position, and the shaft 44 and eccentric 45 have been moved into their alternate 180° position; and the gear 30, which is now the "undersired" gear, has been moved by the eccentric 45 out of clutching engagement with the spindle 32. Hence the other or "desired" gear 31, under the constant influence of its spring 41, is automatically brought into clutching engagement with the spindle 32 by the cooperating clutch means of the pin 35 and the clutch teeth 38; and this corresponds to the "low" speed position of the transmission 20. The respective spring (39 or 41) preferably being of the helical coil type, will be compressed axially within itself whenever the "undesired" gear is pushed out of clutching engagement, and this feature materially enhances the overall compactness of the transmission 20 and renders it more desirable for a portable electric tool.

The teachings of the present invention, in summary, contemplate a pair of spaced-apart constantly-driven gears rotatably mounted upon a spindle and constantly urged (by suitable resilient means) towards clutching engagement with the spindle, in combination with shifting means to move one or the other of the gears away from clutching engagement with the spindle, thereby allowing the other or "desired" gear, under the influence of its particular resilient means, to be brought into clutching engagement with the spindle for rotation in unison; and these teachings, especially as applied to a hand-portable power tool of the type described, results in a number of salient features and advantages, among which are: compactness; ease and convenience of usage; shiftable during operation of the tool; low manufacturing cost; ease of assembly and servicing; and rugged and reliable for trouble-free performance over an extended period of usage.

Obviously, many modifications may be made without departing from the basic spirit of the present invention; and accordingly, within the scope of the appended claims, the invention may be practiced other than has been specifically described herein.

I claim:
1. In a two-speed power tool, the combination of:
 (a) a gear case;
 (b) a spindle journaled in said gear case;
 (c) a pair of spaced-apart constantly driven gears of different size rotatably mounted upon said spindle and movable along said spindle;
 (d) a clutch element carried by said spindle intermediately of said gears;
 (e) clutch means carried by each of said gears for selective engagement with said clutch element;
 (f) means constantly urging each of said gears towards clutching engagement with said element; and
 (g) manually-manipulatable shifting means, counteracting said last-named means, for selectively moving either one of said gears away from said clutch element, thereby allowing the other of said gears to be brought into clutching engagement with said spindle for rotation in unison;
 (h) said manually-manipulatable shifting means including a member disposed intermediately of said pair of gears, radially of said clutch element, and bearing selectively against the inner face of either one of said gears.
2. In a two-speed power tool, the combination of:
 (a) a gear case;
 (b) a spindle journaled in said gear case;
 (c) a pair of driven gears of different size rotatably mounted on said spindle and movable along said spindle;
 (d) cooperating clutch means between said spindle and each of said gears;
 (e) means constantly urging each of said gears towards clutching engagement with said spindle; and
 (f) shifting means, counter-acting said last-named means, for selectively moving either one of said gears away from clutching engagement with said spindle, thereby allowing the other of said gears to be coupled to said spindle;
 (g) said shifting means including a rotatable eccentric member disposed intermediately of the respective inner faces of said gears and providing a "neutral" position wherein both of said gears are engaged by said eccentric member and are declutched from said spindle.
3. In a two-speed power tool, the combination of:
 (a) a gear case;
 (b) an intermediate shaft journaled in said gear case;

(c) a pair of spaced-apart gears of different size carried by said intermediate shaft;
(d) a spindle journaled in said gear case on an axis parallel to said intermediate shaft;
(e) a pair of spaced-apart gears of different size rotatably mounted upon said spindle, movable along said spindle, and being constantly in mesh with and driven by said gears on said intermediate shaft;
(f) cooperating clutch means between said spindle and each of said gears;
(g) means constantly urging each of said gears towards clutching engagement with said spindle; and
(h) shifting means radially of said cooperating clutch means and intermediately of said spaced-apart gears; said shifting means counter-acting said last-named means, for selectively moving either one of said gears away from clutching engagement with said spindle, thereby allowing the other of said gears to be brought into clutching engagement with said spindle for rotation in unison.

4. In a two-speed power tool, the combination of:
(a) a gear case;
(b) a gear case cover;
(c) a spindle journaled in respective bearings in said gear case and said gear case cover;
(d) a pair of spaced-apart driven gears of different size rotatably mounted on said spindle and movable along said spindle;
(e) a clutch pin secured to said spindle intermediately of said gears and having respective end portions extending radially of said spindle;
(f) clutch teeth formed on the inner face of each of said gears for engagement with said clutch pin;
(g) a pair of coil springs mounted on said spindle, each of said springs bearing against the outer face of a respective one of said gears, thereby constantly urging each of said gears towards clutching engagement with said pin; and
(h) a manually-manipulatable shift member disposed intermediately of said gears and radially of said clutch pin for selectively moving either one of said gears against the force of its respective spring and away from clutching engagement with said pin, whereby the other of said gears may be brought into clutching engagement with said pin for rotation in unison with said spindle.

5. A two-speed power tool, comprising:
(a) a motor housing;
(b) a gear case cover secured to said motor housing;
(c) a gear case secured to said motor housing forwardly of said gear case cover;
(d) a motor in said motor housing and having a shaft journaled in said gear case cover and projecting within said gear case;
(e) a pinion formed on the end of said motor shaft;
(f) an intermediate shaft journaled in said gear case on the axis parallel to, and radially offset from, said motor shaft;
(g) an intermediate gear carried by said intermediate shaft and meshing with said pinion on said motor shaft;
(h) a pair of spaced-apart gears of different size carried by said intermediate shaft, one on each side of said intermediate gear;
(i) an output spindle journaled in said gear case on an axis parallel to, and radially offset from, said intermediate shaft;
(j) a pair of spaced-apart gears of different size rotatably mounted upon said spindle, movable along said spindle, and being constantly in mesh with and driven by said gears on said intermediate shaft;
(k) cooperating clutch means between said spindle and each of said last-named gears;
(l) means constantly urging each of said last-named gears towards clutching engagement with said spindle; and
(m) manually-manipulatable shifting means carried by the wall of said gear case and projecting inwardly therefrom radially of said cooperating clutch means and intermediately of said last-named spaced-apart gears; said shifting means counter-acting said last-named means for selectively moving either one of said last-named gears away from clutching engagement with said spindle, thereby allowing the other of said last-named gears to be coupled to said spindle.

References Cited by the Examiner
UNITED STATES PATENTS

| 650,190 | 5/00 | Petrelli. | |
|---|---|---|---|
| 806,916 | 12/05 | Rich. | |
| 1,462,016 | 7/23 | Lewis | 192—67 |
| 1,629,024 | 5/27 | Dietle. | |
| 2,028,389 | 1/36 | Goodwin | 192—89 X |
| 2,225,091 | 12/40 | Wilhide | 192—67 X |
| 2,501,415 | 3/50 | Shampaine. | |
| 2,942,490 | 6/60 | Riley et al. | 192—67 X |

DON A. WAITE, *Primary Examiner.*
DAVID J. WILLIAMOWSKY, *Examiner.*